July 13, 1926.

P. A. GARRETT

APPARATUS FOR AERATING LIQUIDS

Filed March 23, 1925    3 Sheets-Sheet 1

INVENTOR
P.A. GARRETT

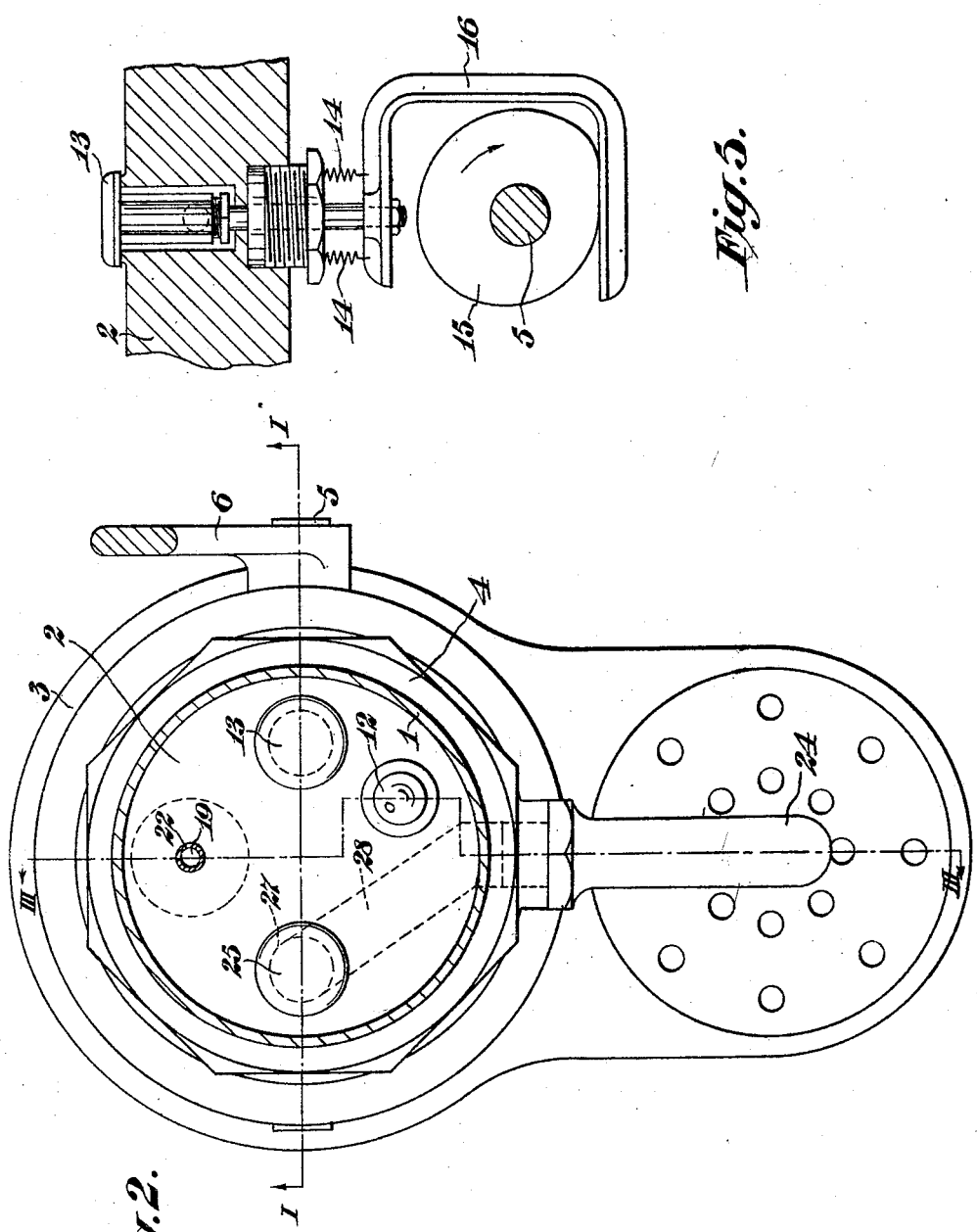

July 13, 1926.
P. A. GARRETT
APPARATUS FOR AERATING LIQUIDS
Filed March 23, 1925     3 Sheets-Sheet 3
1,591,971
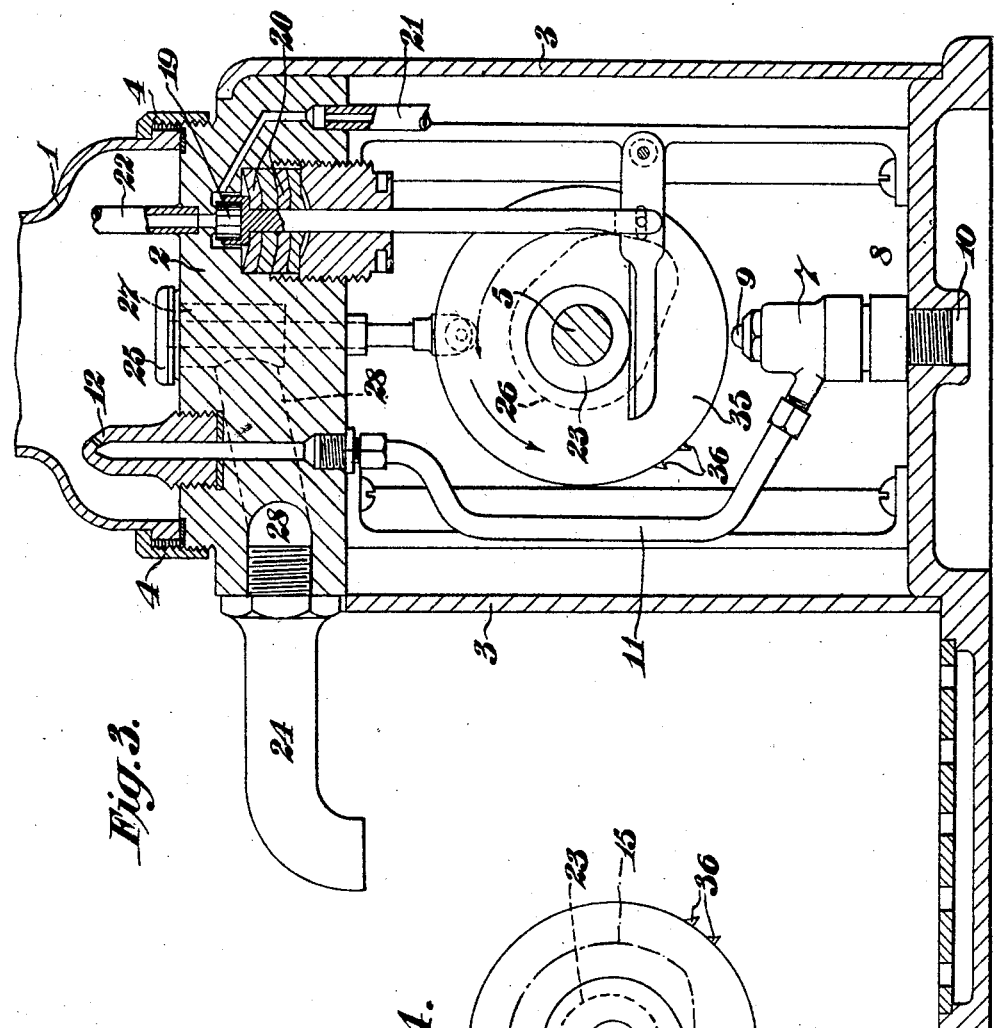
INVENTOR
P. A. GARRETT Patented July 13, 1926.

UNITED STATES PATENT OFFICE.

PERCIVAL ALBION GARRETT, OF GOODMAYES, ENGLAND.

APPARATUS FOR AERATING LIQUIDS.

Application filed March 23, 1925, Serial No. 17,641, and in Great Britain February 4, 1924.

This invention relates to gazogenes and similar apparatus in general for aerating, carbonating or gasifying liquids, the apparatus being of compact form suitable for shop counters.

Machines of this nature generally include an aerating chamber having a snift valve to put said chamber in communication with atmosphere, a liquid valve, a valve-controlled gas inlet, and a valve governing the discharge of aerated liquid.

The present invention aims at a simplified construction, introducing an aerating chamber surmounting a hollow base containing the various valve structures grouped around or about a rotatory shaft which is formed with means to actuate all the valves in desired sequence during its rotation or partial rotation. Thus, by means of a single operating arm, the following sequence may be effected (assuming liquid has already been admitted to the aerating chamber):—liquid valve closed or allowed to close, gas opened, atmospheric or snift valve opened connecting the aerating chamber to atmosphere and permitting the gassed draught to run off and easing the pressure, outflow valve opened (immediately after or simultaneously with the snift), and liquid valve opened again on return of the actuating means to normal.

In the specification of my previous application, Serial No. 604,633 filed December 2, 1922, I have described methods of admitting the gas in a short sharp charge or series of intermittent charges direct to the liquid without recourse to a regulator (or other pressure-reducing appliance) between gas cylinder and aerating chamber. Also, to permit of this, and to enable me to use pressures considerably over the customary 100 lbs. or thereabouts (even up to 750–800 lbs. direct from the cylinder), I constructed the atmospheric snift valve so that it also acted automatically under excess pressure, thereby serving as a safety valve. Such a method of admitting the gas, and also a similar type of snift valve are preferred in the present invention, although it is to be understood that the means for producing the short sharp gas charges hereinafter described may be varied by the substitution of suitable means producing a similar result, or, alternatively, may be replaced by a cam or equivalent device for holding the gas valve open for a prearranged period, if it is desired to employ lower gas pressure. Furthermore, in such latter instance especially, the snift valve need not necessarily be automatic-acting.

In addition to the constructional elements of the present invention broadly outlined above, I provide a second valve-regulated atmospheric opening to the aerating chamber, the valve of which is normally open and controllable as to closure by the liquid inflow. This frees any air-cushion which would impede the ingress of liquid, yet closes the chamber during gassing, and automatically opens during outflow, all independently of the snift valve, which latter in effect, is solely or primarily for the purpose of starting and assisting the outflow, and to relieve the chamber of excessive pressure prior to discharging the aerated draught, and automatically when constructed as a safety blow-off.

An embodiment will be described by way of example, in greater detail, referring to the accompanying drawings, wherein:—

Figure 2 is a sectional plan view of the apparatus taken on the line II—II of Figure 1, showing the disposition of the valves in the bed of the aerating chamber.

Figure 3 is a vertical section, aerating chamber omitted for convenience, taken on the line III—III of Figure 2.

Figure 4 is a diagram of the operating shaft, looking from the left of Figure 1, showing the relative arrangement of the cams.

Figure 5 is a section through the liquid-inlet valve on the line V—V of Figure 1.

Like numerals of reference indicate the same or corresponding parts throughout the several views.

Figure 1:
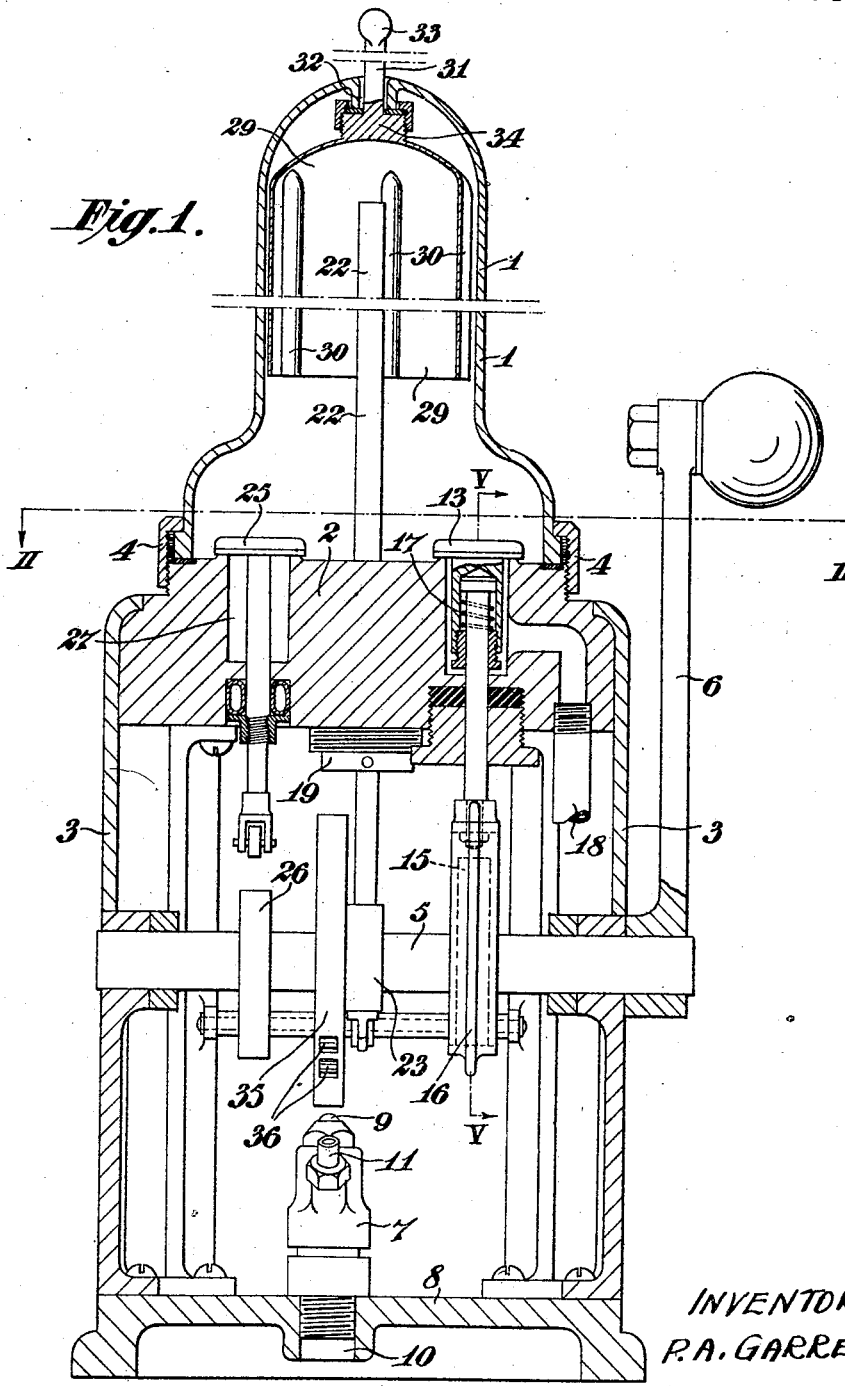
Figure 1 is a vertical section of the embodiment, taken on the line 1—1 of Figure 2.

The aerating chamber is in the form of a closed-top cylindrical or inverted bell-shape member 1 of glass, metal or the like, vertically disposed on the top of a bed 2 mounted at the top of a hollow cast metal or sheet metal base 3. The joint 4 with the bed is or may be furnished with liquid-tight packing. Directly underneath said aerating chamber and mounted horizontally through the base 3 is an actuating shaft 5 provided on the exterior of the base with a knobbed or other operating lever 6. A gas-valve 7 of any suitable construction is mounted in the base plate 8 of the base 3 at right angles or radially to the axis of the shaft 5, and at the end facing the shaft presents a depressible steel ball 9 or other means for opening, and at the remote end is formed with a union 10 for connection to a gas cylinder. The shaft carries means to depress and release the ball sharply so as to admit the gas via a pipe 11 through the bed 2 into the aerating chamber 1 through a suitable jet 12 in a number of short sharp charges; such a means is described later.

A liquid-inlet valve 13 is also located in the bed 2 and is normally held open by the springs 14, but, during the cycle of operations of the apparatus, is held closed by means such as a lug or cam 15 extending from the actuating shaft 5 and pressing open the said valve. Said cam 15 works against the bottom of a stirrup member 16 to which the springs 14 are connected between same and the bed 2. A similar cushioning spring 17 is incorporated in the valve. In the drawings the valve is shown in the normal position wherein the liquid can enter by pressing open the same against the weight of the valve. The said valve 13 supplies, through suitable piping 18, water or the like through the bed 2 to the bottom of the aerating chamber 1. A spring-controlled snift-valve 19, normally closed by the rubber washers 20 or a spring, and also mounted in the bed 2, opens to atmosphere through the pipe 21, and connects with the aerating chamber 1 through a vertical tube 22 extending from the bottom of the chamber 1 to near the top so that the chamber can be opened to atmosphere above liquid level. A second lug or cam 23 extending from the actuating shaft 5 is adapted to open said snift valve 19 in a desired sequence with the other operations as and when the shaft 5 is rotated.

A wide or large area spout 24 is formed or mounted on the side of the base 3 and bed 2 and this is normally closed by a further spring-controlled valve 25, variously referred to herein as the discharge valve or outflow valve. This is also operable by a lug or cam 26 on the actuating shaft 5. The valve chamber 27 communicates with the said spout 24 through a passage 28 in the bed 2. It is preferred to employ a very large area spout so that the draught may be discharged as speedily as possible, and for that reason the controlling discharge valve is necessary as the liquid might otherwise discharge itself by gravity and gas pressure prematurely and with considerable splashing, without opening the snift valve which virtually controls the outflow. But if a nozzle with a narrow opening is suitable for any particular circumstances, then it is possible that this liquid outflow valve 25 may be dispensed with, and the snift alone relied on to govern the discharge of liquid.

At the top of the aerating chamber 1 is an atmospheric opening controlled by a float valve such as the following: an inverted bell or cup 29 forms a slidable fit inside the top of the aerating chamber 1, and is corrugated at 30 or is perforated or otherwise formed to allow a passage of air past same. On the top of the cup there is an upwardly projecting spindle 31 passing through an orifice 32 in the domed or other top of the aerating chamber 1 outside which it terminates in a knob 33. The interior end of the orifice or passage is constructed as a seating against which the float may rise to close the aperture, the domed top of the said float 29 being constructed at 34 as a valve. The dimensions and buoyancy of the float are such that when liquid to a predetermined quantity has risen in the aerating chamber, the float will have risen sufficiently to close the aperture, and thus prevent further liquid inflow. Gassing of the liquid causes a firmer closure. If the float sticks, agitation to free same can be effected by means of the projecting knobbed spindle 31—33 of the float 29.

As one means for actuating the gas valve 7 (which I have thought unnecessary to illustrate) I may mount on the actuating shaft 5 a disc member formed with a peripheral pocket somewhat as follows. One part of the pocket is an arcuate concentric slot large enough to house two or three loose steel balls projecting out of the slot to engage the ball 9 of the gas valve 7 hereinbefore referred to; continuing from such slot is a larger and deeper pocket into which the balls can jump one after the other as the actuating shaft is rotated and the balls successively pressed past the valve ball 9. The large part of the pocket (in the normal position) extends from one side of the valve ball to slightly past same where the base is curved up to the base of the smaller pocket. It will be seen, therefore, that when the disc member with the aforesaid special shaped pocket is rotated and the balls lodged in the larger part (where they do not project outside the periphery) after actuating the gas valve, then on return to the normal, the balls will freely roll back past the valve ball and resume their original position. The number of short sharp charges of gas depends upon the number of said balls employed.

The operation of the apparatus briefly explained in the opening hereof is as follows:—The operating lever 6 (which may be spring-controlled or otherwise to return and keep it in the starting position) is in a position allowing the liquid inlet valve 13 to open, under the action of the spring 14, as illustrated. Liquid has entered the aerating chamber 1 until the float 29 has risen to close the valve 32—34. Movement of the said lever 6 and its actuating shaft 5 closes and holds closed the liquid inlet valve 13 against the action of the springs 14, admits gas by the wheel 35 and valve 7, then in continuing opens the snift and outflow valves 19 and 25 respectively, and the gassed draught is delivered. The float 29 then falls, and on return of the lever 6 to its original position, snift 19 and outflow 25 are closed, the gas valve 7 unaffected by the free-wheel 35, and the liquid valve 13 allowed to open, liquid entering for a new draught until the float again closes.

I claim:—

1. Apparatus for aerating liquids comprising an aerating chamber, an atmospheric valve to said chamber which automatically closes on the admission of a predetermined quantity of liquid, and mechanically-operated valves controlling respectively the inlet of liquid to the chamber, the inlet of gas, snifting of the chamber, and the discharge of the aerated draught, and means for operating the mechanically-operated valves in correct sequence, including a rotary cam shaft, and means operated by said cam shaft for pressing the liquid inlet valve during gassing, snifting and discharge.

2. In apparatus for aerating liquids including an aerating chamber, a bed supporting said chamber, a rotatory cam shaft, a liquid admission valve normally held open by a spring or equivalent means, the spindle of which is arranged to be moved to the closed position by a cam on the rotatory shaft, a gas inlet pipe in said bed leading from a gas valve adapted to be opened by a cam on the rotatory shaft, a snift valve in said bed communicating by a pipe to near the top of the aerating chamber, and adapted to be opened by a cam on the rotatory shaft, and a discharge valve in said bed wherethrough the aerated draught may be run from the aerating chamber to a discharge nozzle, said discharge valve being actuated by a cam on the rotatory shaft, substantially as described.

3. In apparatus for aerating liquids including a liquid admission valve, a gas valve, a snift valve, a discharge valve, a rotatory shaft, cam means controlled by said shaft for operating said valves whereby the liquid admission valve is closed and held closed throughout the complete cycle, following the closure of which the gas valve is opened and closed following which the snift valve is opened and held so until the cycle is completed, following the opening of the snift the discharge valve is opened, all occurring during a continuous movement of the rotatory shaft, the discharge valve being held open as long as desired by a "dwell" in the movement of the shaft, which latter is then returned, closing the discharge valve and the snift valve, unaffecting the gas valve, and opening the liquid inlet valve to complete the cycle when the shaft comes to rest, substantially as described In testimony whereof I have affixed my signature hereto this 4th day of March 1925.

PERCIVAL ALBION GARRETT.